(12) United States Patent
Wei

(10) Patent No.: US 6,233,286 B1
(45) Date of Patent: May 15, 2001

(54) PATH-ORIENTED DECODER USING REFINED RECEIVER TRELLIS DIAGRAM

(75) Inventor: Lee-Fang Wei, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/049,268

(22) Filed: Mar. 27, 1998

(51) Int. Cl.$^7$ ................................................. H04L 23/02
(52) U.S. Cl. .................... 375/265; 375/260; 375/261; 375/262; 375/340
(58) Field of Search .................... 375/265, 340, 375/234, 341, 262, 260, 261, 222; 714/786; 348/470

(56) References Cited

U.S. PATENT DOCUMENTS

| | | | |
|---|---|---|---|
| 5,056,117 | 10/1991 | Gitlin et al. ........................... | 375/234 |
| 5,559,561 | * 9/1996 | Wei ....................................... | 348/470 |
| 5,570,391 | * 10/1996 | Lin et al. .............................. | 375/265 |
| 5,675,590 | * 10/1997 | Alamouti .............................. | 714/786 |

OTHER PUBLICATIONS

G. D. Forney, Jr., "The Viterbi Algorithm," Proceedings Of the IEEE, vol. 61, pp. 268–278, Mar. 1973.
A. Duel–Hallen and C. Heegard "Delayed Decision–Feedback Sequence Estimation," IEEE Transactions on Comm., vol. 37, pp. 428–436, May 1989.
P. R. Chevillat and E. Eleftheriou, "Decoding Of Trellis–Encoded Signals In The Presence of Intersymbol Interference And Noise," IEEE Trans on Comm., vol. 37, pp. 669–676, Jul. 1989
M. V. Eyuboglu and S. U. H. Qureshi, "Reduced–State Sequence Estimation For Coded Modulation On Intrersymbol Interference Channels," IEEE Journal on Selected Areas in Comm., vol. 7, pp. 989–995, Aug. 1989.
S. Mohan and A. K. Sood, "A Multiprocessor Architecture For The (M, L)– Algorithm Suitable For VlSI Implementation," IEEE Trans. on Comm., vol. 34, pp. 1218–1224, Dec. 1986.
F. K. Soong and E. F. Huang., "A Tree–Trellis–Based Fast Search For Finding The N Best Sentence Hypotheses In Continuous Speech Recognition," ICASSP 91. International Conf. on Acoustics, Speech and Signal Processing, pp. 705–708, 1991.
N. Seshadri and C.–E. W. Sundberg, "List Viterbi Decoding Algorithms With Applications, " IEEE Transactions on Communications vol. 42, pp. 313–323. Feb./Mar./Apr. 1994.

* cited by examiner

*Primary Examiner*—Stephen Chin
*Assistant Examiner*—Shuwang Liu
(74) *Attorney, Agent, or Firm*—Ronald D. Slusky; John F. McCabe

(57) ABSTRACT

Improved error rate performance of data transmissions systems using both coded and uncoded modulation in the presence of more-than-mild intersymbol interference is achieved in the receiver using M-path joint decision feedback equalizer/decoder in conjunction with a finer partition of the constellation than was used in the transmitter and a refined receiver trellis diagram based on that finer partition.

27 Claims, 7 Drawing Sheets

CURRENT STATE        NEXT STATE

PATH-ORIENTED DECODER USING REFINED RECEIVER TRELLIS DIAGRAM

BACKGROUND OF THE INVENTION

The present invention relates to data communication and, in particular embodiments, to the communication of data over channel exhibiting intersymbol interference.

An intersymbol interference (ISI) channel is one in which the signal energy of a signal point transmitted in one signaling interval becomes dispersed over a number of adjacent signaling intervals. One example is a channel used to communicate data over a cable TV coaxial cable. Another is a wireless, or cellular, telecommunications channel, the dispersion being principally due to the phenomenon referred to as multi-path. In any such ISI channel, the dispersed energy combines with signal points transmitted in the adjacent intervals and thus constitutes a source of noise in those other interval. When the level of ISI is small, a so-called linear equalizer is effective in mitigating against it. However, if the ISI is severe, other, more powerful techniques must be brought into play. Typically, a decision feedback equalizer (DFE) is used. DFE is an interference cancellation technique. It estimates the amount of ISI in a given received signal point and subtracts the ISI estimate therefrom to arrive as a ISI-compensated signal point from which a decision is made as to the identity of the transmitted signal point.

Even better results can be achieved using a technique referred to as "maximum likelihood decoding for ISI channels." (See, for example, G. D. Forney, Jr., "The Viterbi Algorithm," Proc. IEEE, Vol. 61, pp. 268–278, March 1973.). That technique takes advantage of the recognition that the ISI phenomenon can be modeled as a for of convolutional coding within the channel. Therefore known techniques for decoding convolutional codes, such as Viterbi decoding, can be applied to the received ISI-corrupted signal even in a case where the transmitted signal point stream was not processed with any explicit convolutional coding in the transmitter. The underlying theory of this approach is that it provides what I have come to refer to as "conversion gain," this being the improvement in error immunity that results from the con version of at least a portion of the harmful ISI into useful signal energy. Thus rather than Subtracting the ISI energy from the received signal, the ISI is returned to the signaling interval from which it came. The signal-to-noise ratio, and therefore the receiver error performance, are thereby improved.

Practical application of this approach is quite limited, however. The number of so-called states, S, in the Viterbi decoder is roughly given by $S=C^L$, where C is the number of signal points in the transmitter constellation (its "size"), and L is the number of signaling intervals over which there is significant dispersion. Thus except for cases in which C and L are relatively small, the number of states, S, and thus the associated complexity of the Viterbi decoder, will be prohibitively large from an implementational standpoint. Indeed, few present-day communication systems meet the criterion of small C and/or small L. Moreover, if explicit convolutional coding were to be implemented in the transmitter, the complexity would be even far greater, reducing even further the practical applicability of this technique. The principal object the invention, then, is to be able to achieve the performance advantage offered by the above-described maximum likelihood decoding for ISI channels, without suffering the implementational complexity that arises for large values of C and/or L.

SUMMARY OF THE INVENTION

The above and other objects are achieved by a technique for processing transmitted signal points received from a transmitter, each transmitted signal point being from a respective one of a sequence of transmitter subsets of signal points as defined by an N-state transmitter trellis diagram. Responsive to the received signal points, successive sets of M surviving signal point paths through a receiver trellis defined by a receiver trellis diagram are identified and, in accordance with the invention, the identifying is such that more than one path corresponding to an individual sequence of transmitter subsets of signal points can be identified as ones of the surviving paths. The transmitted signal points can then be recovered as a function of the surviving paths.

In preferred embodiments, the received signal points are decoded as though they had been divided in the transmitter into finer subsets-referred to herein as the "receiver subsets"—than they actually were, and using a refined receiver trellis diagram The refined receiver trellis diagram is the same as the trellis diagram used by the transmitter, except that it has more than one branch for at least some of its state transitions. Each of those more-than-one branches is associated with one of the finer receiver subsets which is a part of the transmitter subset associated with the state transition. Calculation of branch metrics in the decoder and subsequent identification of surviving paths are carried out in a way which allows for the possibility that two or more paths, each associated with the same sequence of transmitter subsets, can be identified as surviving paths.

Also in preferred embodiments, each branch metric is calculated based on a respective ISI-compensated received signal point, wherein-as described in my co-pending U.S. patent application Ser. No. 09/023,063 filed Feb. 12, 1998—the ISI estimate is a function of the surviving path from which the branch in question emanates, and the surviving paths are identified using path-oriented, rather than state-oriented, pruning.

The invention is applicable not only to arrangements implementing coded modulation, for which N is greater than 1, but also to arrangements using uncoded modulation, for which N is equal to 1. In the latter arrangements, the decode is as just described (even though uncoded modulation arrangements typically use so-called "slicing" rather than decoding), the transmitter trellis diagram being a default trellis diagram having only one state and only one state transition.

Advantageously, the present invention introduces only a relatively small amount of complexity to the processing carried out in the receiver, but provides a very large amount of processing gain, by which I mean the combined effect of a) the coding gain afforded by the transmitter modulation coding, if any, and b) the aforementioned conversion gain. That processing gain manifests itself in the form of a significant improvement in the overall error rate performance of the communication system.

DETAILED DESCRIPTION

Figure 1:
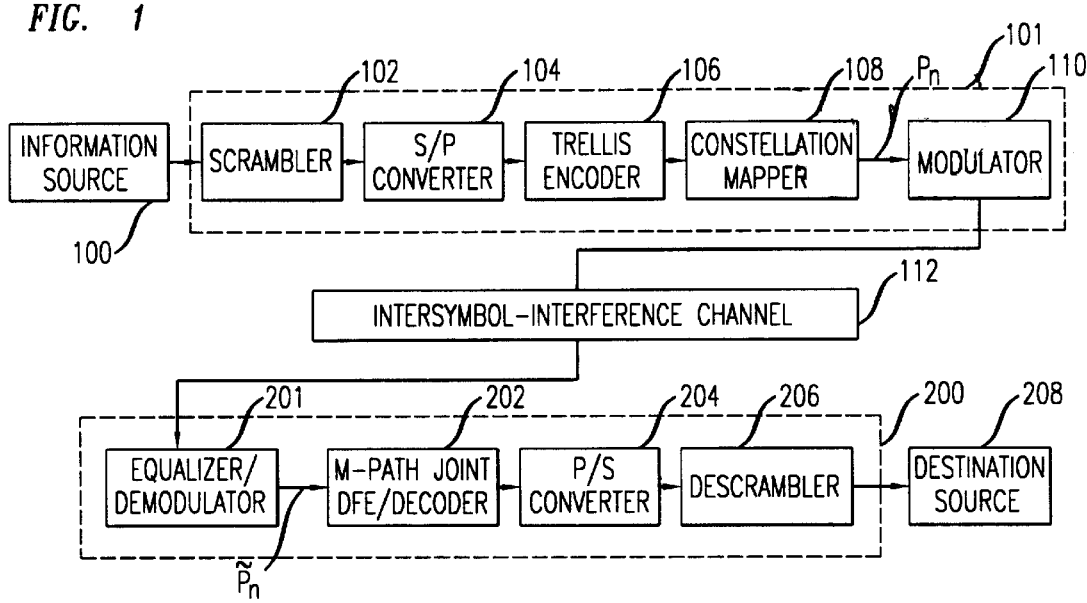
FIG. 1 shows a generalized block diagram of a communication system in which the present invention is illustratively used.

A model of a communication system in which the invention is illustratively used is shown in FIG. 1. A sequence of bits generated from an information source 100 (such as a PC or computer terminal) is input to a transmitting modem 101 and, in particular, to a scrambler 102 thereof, which randomizes the bits in a conventional manner. The serial bit stream output from scrambler 102 is provided to a serial-to-parallel (S/P) converter 104. The bits provided in parallel at the output of converter 104 are applied to trellis encoder 106, which processes them in a manner to be described and provides a number of trellis encoded output bits to constellation mapper 108. (In embodiments of the invention in which the modulation is uncoded, as described in further detail below, trellis encoder 106 is not used.) As described in further detail hereinbelow, constellation mapper 108 provides channel signal points P. to a modulator 110 by selecting the signal points from a predetermined constellation of signal points, illustratively the constellation of FIG. 3. In particular, constellation mapper 108 uses a portion of the output bits—illustratively, Y2Y1Y0 in FIG. 2—from trellis encoder 106 to select a transmitter subset of the points of the signal constellation, such as the signal points labeled "A" in FIG. 3, and uses the remaining output bits—illustratively, Y4Y3—to select a signal point from the selected transmitter subset, such as the signal point associated with the bit pattern 01000. The selected signal point is provided to a conventional pulse-shaping filter (not shown) and then to modulator 110. Modulator 110 modulates the sequence of selected signal points and pro ides a modem output signal onto a communication channel 112.

In channel 112 the transmitted signal is subjected to intersymbol interference ("ISI"). It is also corrupted by so-called additive Gaussian noise. The resulting noise- and ISI-corrupted signal is ultimately delivered to receiving modem 200.

Within receiving modem 200, the received signal is processed in a conventional manner by equalizer/demodulator 201 to generate a corrupted signal point $\tilde{P}_n$ from which some of the intersymbol interference—principally the so-called precursors—has been removed. Signal point $\tilde{P}_n$ is then processed by M-path joint DFE/decoder 202 to further equalize the signal—principally to remove so-called postcursors—and to decode the signal to recover the transmitted signal point. Decoder 202 utilizes the decoding technique of the present invention, as described in detail hereinbelow, arriving at a final decision $\hat{P}_{n-D}$ as to the value of a signal point transmitted D signal points earlier. The output of decoder 202, comprising the data bits corresponding to $\hat{P}_{n-D}$, is provided to a parallel-to-serial (P/S) converter 204, descrambled in a conventional manner by a descrambler 206, and received by destination source 208 (which may be, for example, a mainframe computer or another PC).

Figure 2:
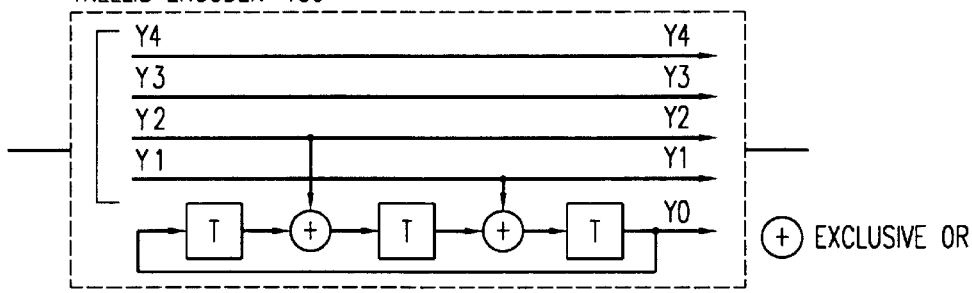
FIG. 2 shows an illustrative embodiment for a trellis encoder used in the communication system of FIG. 1.

FIG. 2 is an illustrative implementation of an N-state trellis encoder 106, with N=8. The input to trellis encoder 106 from S/P converter 104 comprises the four data bits Y1 through Y4 received during a so-called signaling interval of duration T. Trellis encoder 106 is illustratively a systematic encoder, meaning that each of its input data bits passes through the encoder unchanged to become one of its output bits. Trellis encoder 106 has one additional output bit Y0—which is the so-called redundant bit. In particular, encoder 106 is a finite-state machine in which the encoder state is defined by the bit values currently stored in its three T-second delay elements. As seen from the FIG. 2, the value of bit Y0 is a function of the current encoder state and the values of Y1 and Y2.

More particularly, the three T-second delay elements are interconnected through two exclusive-OR gates as shown. Since each of the three delay elements can contain a binary "0" or "1" at any point in time, the trellis encoder has $N=2^3=8$ so-called states and indeed is referred to as an 8-state encoder. As each new set of values of Y1 and Y2 arrives for each new signaling interval, the bit values stored in the delay elements are updated, thereby advancing, or transitioning, the encoder to a new state. This process is repeated for a succession of signaling intervals, with the encoder transitioning through a sequence of states.

Figure 3:
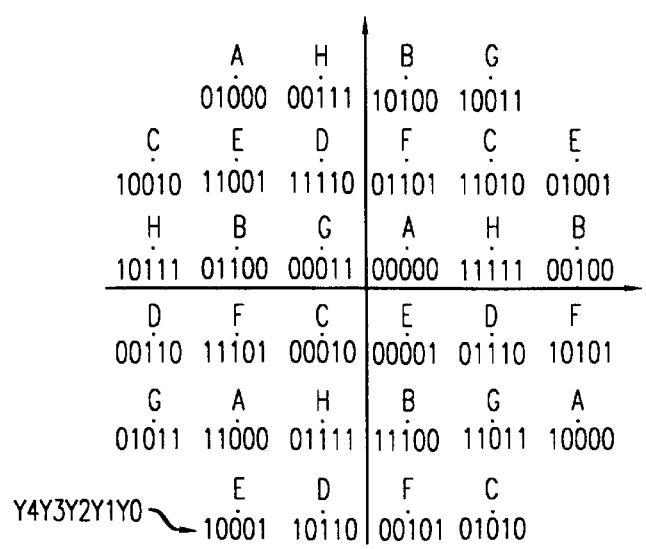
FIG. 3 shows an illustrative thirty-two signal point constellation partitions into eight transmitter subsets.

The values of bits Y0 through Y4 determine which signal point of a predetermined 32-signal-point constellation should be transmitted as signal point $P_n$. That constellation is the one shown in FIG. 3. The constellation is comprised of eight transmitter subsets of signal points A through H, each in turn comprised of four signal points as shown. The values of bits Y0 through Y2 identify which of the eight transmitter subsets signal point $P_n$ is to be taken from. The values of bits Y3 and Y4 select as $P_n$ a particular one of the four signal points within the identified transmitter subset. The structure of encoder 106 is such that not all sequences of states can actually occur. As a result, not all sequences of the three-bit combination Y2Y1Y0 can actually occur. The overall consequence is that the signal points of the constellation of FIG. 3 are allowed to be taken only from certain sequences of transmitter subsets. This constraint is what allows the received signal points in a trellis coded system to be decoded in a way which provides enhanced immunity to noise and other channel impairments.

Figure 4:
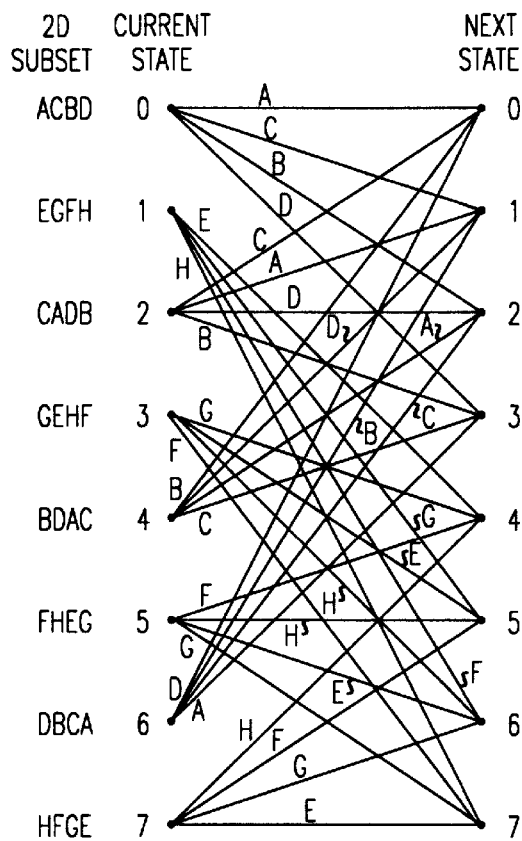
FIG. 4 shows a transmitter trellis diagram that represents the operation of the trellis encoder of FIG. 2.

The eight-state trellis diagram of FIG. 4 illustrates the operation of trellis encoder 106 from another perspective.

The eight states of the trellis encoder 106 are denoted 0 through 7. The two vertical lines of points in FIG. 4 respectively represent the possible current and next encoder states. The trellis diagram defines, for each current encode state, which next states the encoder is allowed to transition to. The lines, or branches, connecting various pairs of states indicate the allowed state transitions. For example, th encoder can transition from current state 0 to any one of next states 0, 1, 2 or 3 but not to my other state.

Every branch in FIG. 4 bears a label indicating which one of transmitter subsets A through H the signal point being generated is to come from. Assume that the current state of the encoder is 0 and that, after receiving a new pair of input bits Y1 and Y2 the encoder is now in state 1. This means that the next signal point to be output is to come from transmitter subset C since the line connecting state 0 in the left column to state 1 in the right column is labeled C. With the encoder now in state 1 (the new current encoder state), the encoder can transition to any of states 4, 5, 6 or 7, and thus the next signal point is constrained to come from one of the transmitter subsets E, G, F, or H, depending on which of those states the encoder has transitioned to.

Figure 5:
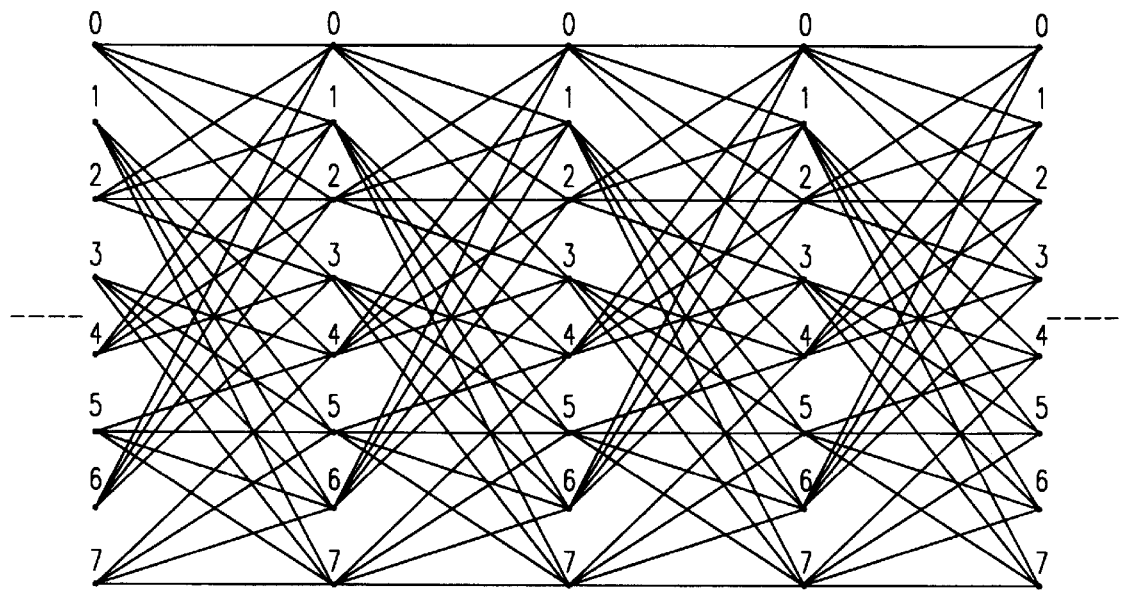
FIG. 5 shows a portion of the trellis corresponding to the trellis diagram of FIG. 4.
Figure 6:
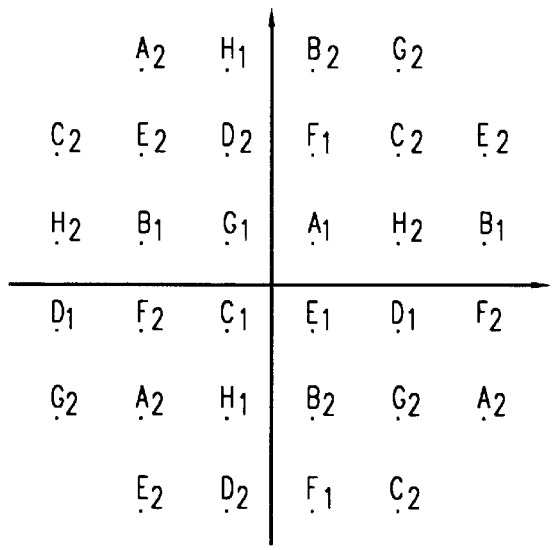
FIG. 6 shows the constellation of FIG. 3 in which each of the eight transmitter subsets is further partitioned into two receiver subsets pursuant to the principles of the invention.

A sequence of concatenations of trellis diagrams associated with a particular trellis code comprises a trellis. For example, FIG. 5 shows a portion of the trellis co responding to the trellis diagram of FIG. 4. In particular, FIG. 5 represents four successive state transitions of the trellis encoder. The branches represent the possible transitions of the encoder from a current to a next encoder state. A sequence of signal points selected from any sequence of interconnected branches is a so-called path through the trellis Conventional decoding of a trellis encoded signal in the receiver uses the same subset partitioning and trellis diagram that was used in the transmitter. In accordance with the principles of the invention, by contrast, the received signal points are decoded as though they had been divided in the transmitter into finer coding subsets—referred to herein as the "receiver subsets"—than they actually were, and using a refined, receiver trellis diagram. Thus as shown in FIG. 6 each of the eight transmitter subsets A through H of FIG. 3 is further partitioned into, illustratively, two receiver subsets, $A_1$ and $A_2$, $B_1$ and $B_2$, etc., pursuant to the principles of the invention. The partitioning is carried out in such a way the minimum distance between the signal points in any receiver subset is greater than the minimum distance between the signal points of any transmitter subset. It is not required to have the same number of signal points in each receiver subset. Thus, for example, receiver subsets $A_1$ and $A_2$ have one and three signal points, respectively. On the other hand, receiver subsets $B_1$ and $B_2$ each have two signal points. If desired, as described in further detail hereinbelow, the number of receiver subsets that the transmitter subsets are partitioned into can, if desired, be adapted to channel conditions.

Figure 7:
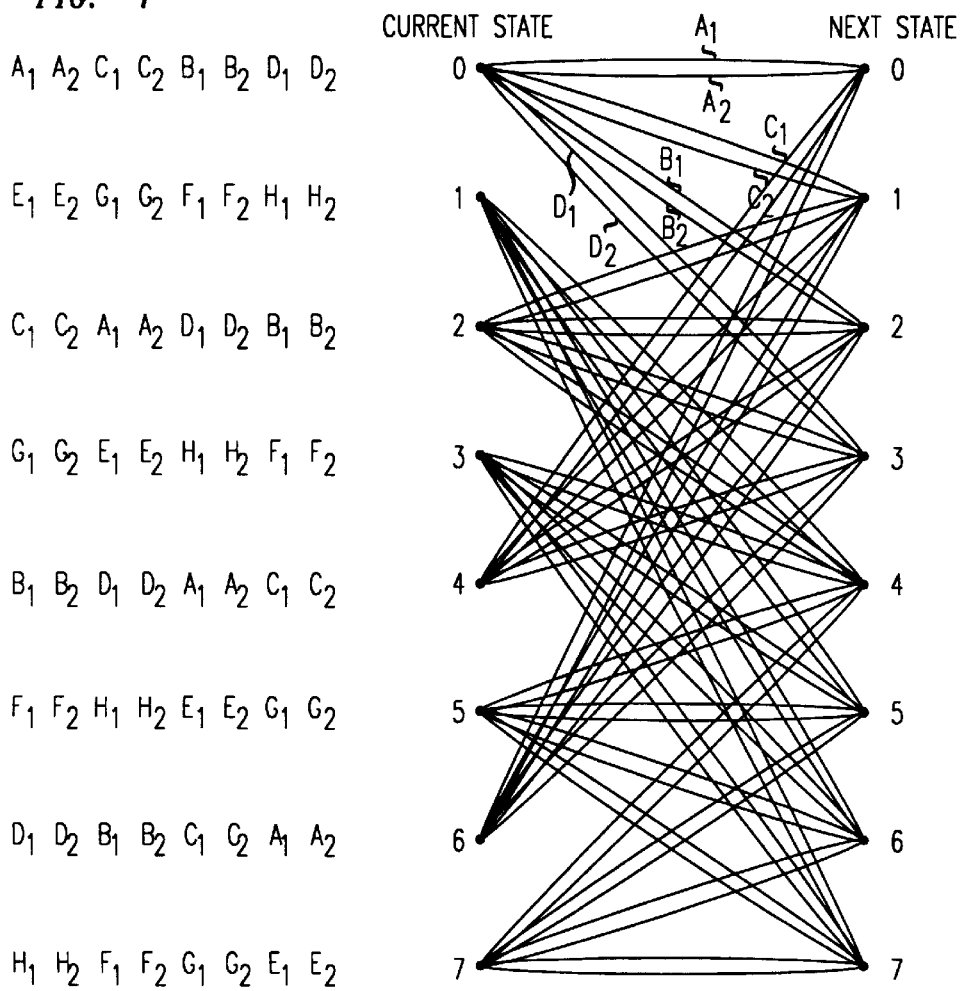
FIG. 7 shows a receiver trellis diagram based on the sixteen-subset partition of FIG. 6, pursuant to the principles of the invention.

The aforementioned refined receiver trellis diagram is shown in FIG. 7. The refined, receiver trellis diagram has state transitions corresponding to state transitions of the transmitter trellis diagram and is the same as the transmitter trellis diagram of FIG. 4, except that it has two branches for each state transition, each branch being associated with one of the finer receiver subsets which is a part of the transmitter subset associated with the state transition. Thus, for example, the state transition in FIG. 4 associates with subset C connecting current state 0 to next state 1 is replaced in the trellis diagram of FIG. 7 by two parallel branches associated with receiver subsets $C_1$ and $C_2$, respectively. The manner in which this refined trellis diagram is used will be described shortly.

Figure 8:
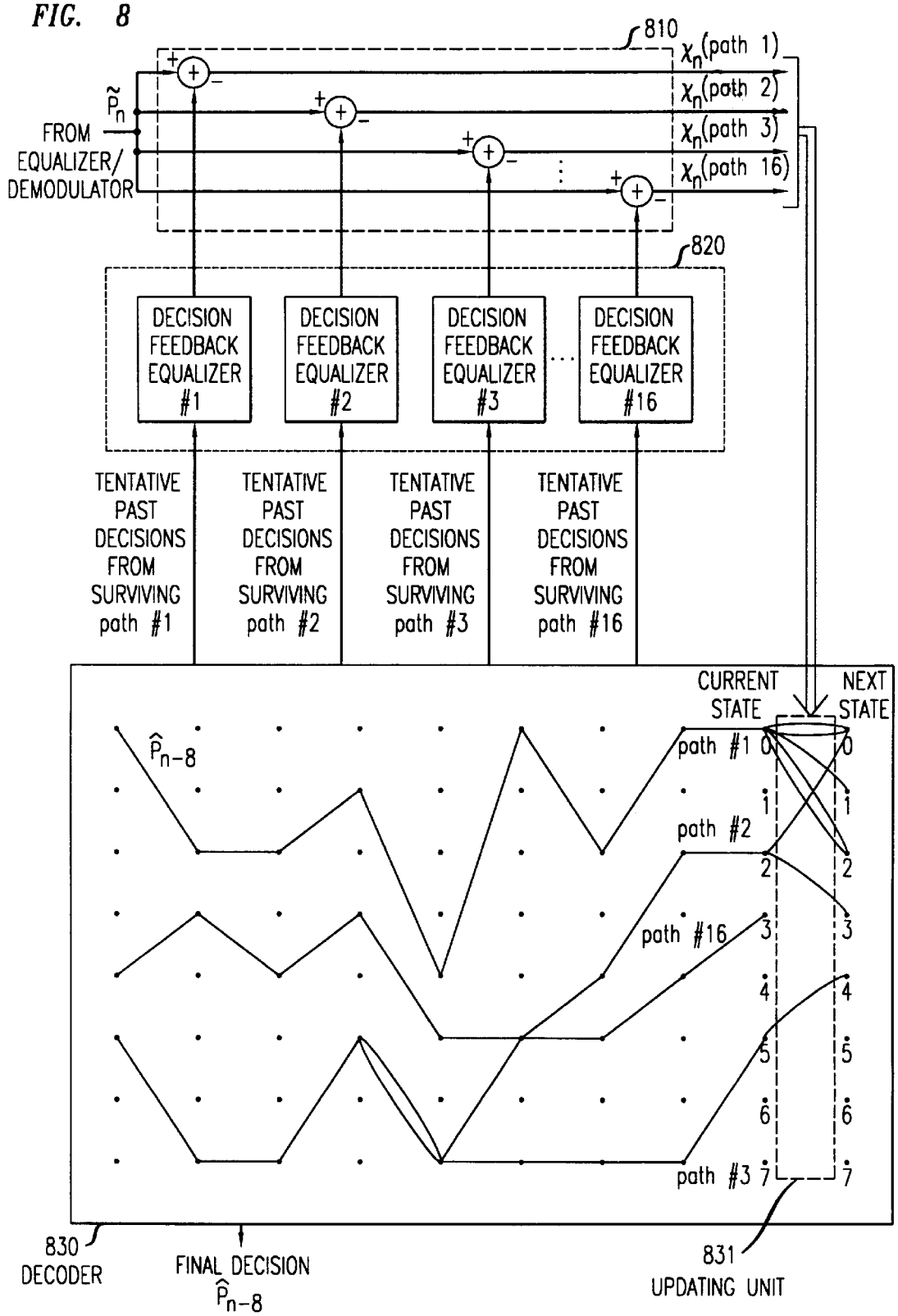
FIG. 8 provides a functional view, at a particular point in time, of the M-path joint DFE/decoder of FIG. 1.
Figure 9:
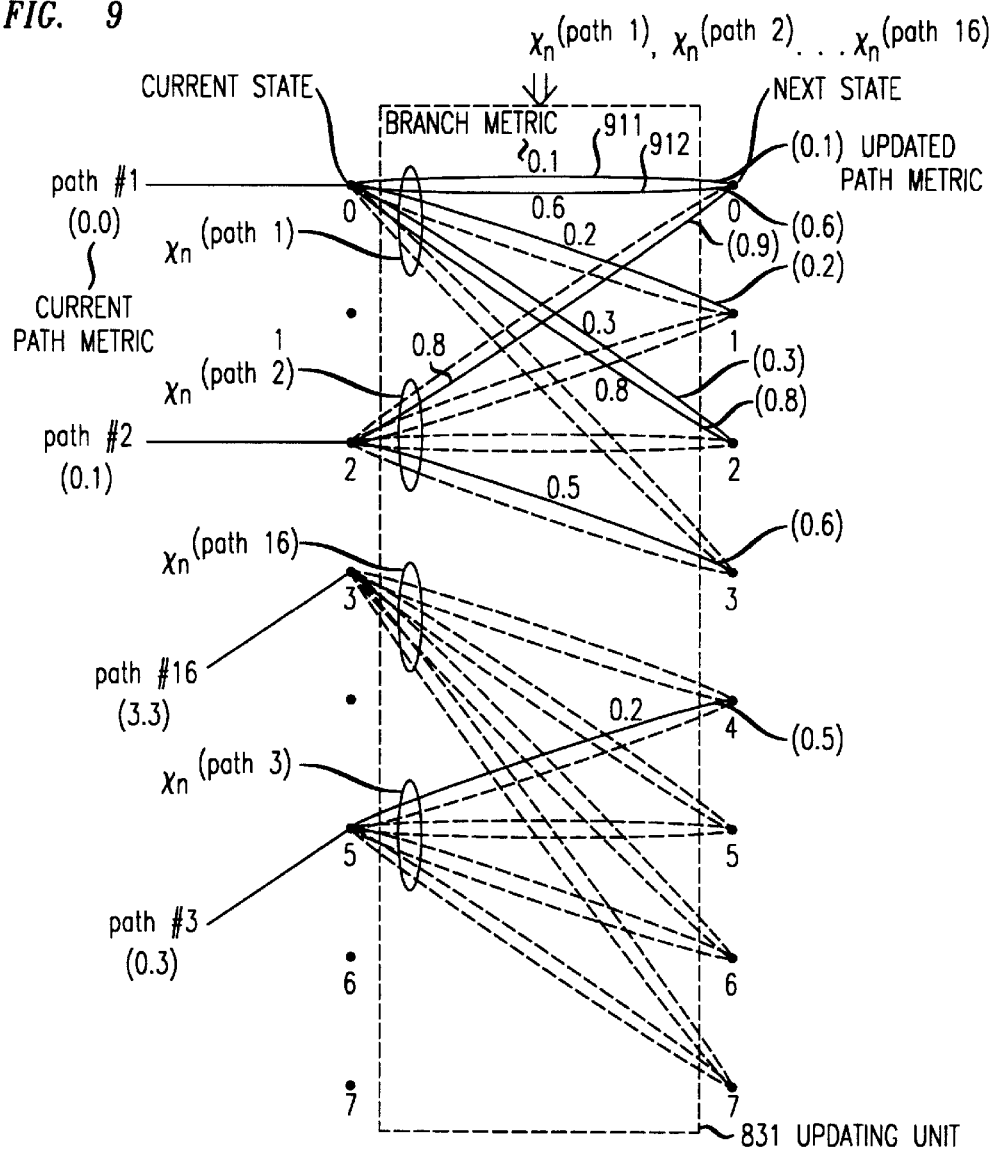
FIG. 9 is a diagram helpful in explaining the operation of the M-path joint DFE/decoder of FIG. 8.

As noted earlier, joint DFE/decoder 202 in receiver 200 subjects the received signal point $\tilde{P}_n$ to decision feedback equalization prior to performing its decoding. FIGS. 8 and 9 shows this in some detail.

In particular, FIG. 8 shows a DFE/decoder similar to the M-path joint DFE/decoder disclosed in my above-cited '063 patent application, the difference between them being the manner in which path updating is performed within updating unit 831 as described below. As shown in the FIG. 8, M=16 replicas of $\tilde{P}_n$ are formed and a respective estimated intersymbol interference, or ISI, component is subtracted from each replica by a respective one of adders 810, to produce equalized signals $x_n^{(path\ 1)}$ through $x_n^{(path\ 16)}$. The ISI components are provided by respective ones of decision feedback equalizers 820, as described below.

The representation of decoder 830 in FIG. 8 shows four of sixteen so-called surviving paths #1 through #16 extending through the trellis, the four paths shown being paths #1, #2, #3 and #16. For drawing simplicity, the other twelve surviving paths are lot shown. The signal points along each path constitute a sequence of tentative signal point decisions. A metric is maintained for each surviving path and, as described below, the current equalized signals $x_n^{(path\ 1)}$ through $x_n^{(path\ 16)}$ are used to determine new surviving paths having updated path metrics. A final decision $\hat{P}_{n-8}$ is thereupon made as to the value of one of the received signal points—specifically one that was received in this case) 8 signaling intervals earlier. The so-called decoding depth of "8" is used herein for purposes of illustration. In actual practice, the decoding depth depends on the code that is being used and will typically be greater than 8. Typically, the path having the smallest metric at this time—called the very best surviving path—is identified. The Signal point on that path 8 signaling intervals earlier is taken as the final signal point decision.

In some applications, such as those using so-called blockwise-terminated codes, successive sets of surviving paths are determined, but the making of at least some decisions is postponed until, for example, the last signal point in the block has been received. At that time, the signal points obtained by tracing back along the very best path to the point where the making of decisions was left off—or possibly back to the beginning of the block if all decision-making was postponed—are declared, a at one time, to be transmitted points. The present invention can be used in such arrangements as well.

Each of DFEs 820 is associated with a particular one of the surviving paths #1 through #16. In particular, each DFE generates its aforementioned respective estimated ISI component, or ISI estimate, as a function of the tentative signal point decisions which lie along the associated surviving path. At this time, the ensemble of tentative signal point decisions along each surviving path is applied to the associated DFE in preparation for the generation of ISI estimates to be applied to adders 810. In particular, as is well known, a DFE forms its ISI estimate by forming a combination (illustratively a linear combination) of the decisions that have been input to it using an ensemble of coefficients whose values typically are adaptively updated. Thus it will be seen that each of the equalized signals $x_n^{(path\ 1)}$ through $x_n^{(path\ 16)}$ is associated with a particular surviving path in that the ISI estimate that was used to form that equalized signal was generate as a function of the associated surviving path.

The process by which, as mentioned above, the current equalized signals $x_n^{(path\ 1)}$ through $x_n^{(path\ 16)}$ are used to determine new surviving paths having updated path metrics is carried out by updating unit 831 within decoder 830. FIG. 9 illustrates that process. The aforementioned illustrative four of the sixteen surviving paths—#1, #2, #3 an #16—are again shown. Each one of the surviving paths shown—#1, #2, #3 and #16—happen to enter a different respective current coder state at this time although, in general as described below, it is possible for more than one surviving path to enter a particular coder state. It will also be appreciated that the labels #1, #2, etc. are arbitrary and could be changed from cycle to cycle, as long as the outputs of the appropriate DFE's 820 are used in the branch metric generation described below. At this point, the decoding process proceeds to calculate so-called branch metrics for each of the 128 current-to-next-state branches emanating from the 16 surviving paths in accordance with the receiver trellis diagram of FIG. 7 (for simplicity, only 32 such branches are shown in FIG. 9). The branch metric for each branch is given by the squared Euclidean distance between one of the equalized signals $x_n^{(path\ 1)}$ through $x_n^{(path\ 16)}$ and the closest signal point in the receiver subset associated with that branch. For drawing simplicity illustrative values of only some of the branch metrics are shown. The particular one of the equalized signals $x_n^{(path\ 1)}$ through $x_n^{(path\ 16)}$ that is used to calculate any given one of the branch metrics is the equalized signal associated with the surviving path from which that branch emanates. Thus equalized signal $x_n^{(path\ 1)}$ is used in calculating the eight branch metrics for the eight branches between current state 0 and next states 0, 1, 2, and 3; $x_n^{(path\ 2)}$ is used n calculating the eight branch metrics for the branches between current state 2 and, again, next states 0, 1, 2 and 3; and so on. There are 128 candidate paths at this point, eight leading from each of the sixteen surviving paths. Each candidate path has an associated metric given by the sum of the current path metric of the corresponding surviving path and the branch metric of the corresponding branch.

Updating unit 831 uses the technique described in my above-cited '063 patent application in which the paths retained as the surviving paths are those M candidate paths having the smallest updated path metrics, even if that means that two candidate paths leading into the same next coder state are retained. In this example, M=16. Thus the M=16 candidate paths having the lowest path metrics are retained as the new surviving paths. For drawing simplicity, only the new surviving paths emanating from the previous surviving paths #1, #2, #3 and #16 are shown. There happen to be 8 of them, shown in solid line. Their path metrics, ranging from 0.1 to 0.9, are also shown. Note that three of the surviving paths happen to all lead into next coder state 0 and two of the surviving paths happen to lead into next coder state 2. For drawing simplicity, the other 8 surviving paths are not shown.

I refer to this approach for identifying the surviving paths as a "path-oriented" approach, as contrasted with the conventional, state-oriented approach used in Viterbi decoders, in which only one path entering a state can be declared a surviving path. The advantage of the path-oriented approach can be understood as follows: Repeating what was noted above, the ISI estimate generated by each DFE is a function of a respective surviving path through the trellis. As a result, each of the ISI-compensated signals $x^{n(path\ 1)}$ through $x_n^{(path\ 16)}$ is also a function of some surviving path. The branch metrics, in turn, are a function of the ISI-compensated signals. Ultimately then, the branch metric for branches which extend from any given path are themselves a function of the path itself—actually the tentative decisions along that path. This all being so, it is the case that of the two or more paths leading into a state, the path that has the smallest metric at a particular point in time may ultimately not have the smallest path metric once extended because the branch metrics for each branch—even though extending from the same state—are path-dependent and therefore different.

Thus, for example, consider in FIG. 9 the two surviving paths 911 and 912 extending from the previous surviving path #1 and leading to next state 0. The previous surviving path #1 had a path metric of 0.0. The two branches leading from that surviving path #1 at current state 0 and leading to next state 0 have respective branch metrics 0.1 End 0.6. Thus new surviving path 911 has an updated path metric of 0.1 and new surviving path 912 has an updated path metric of 0.6. A conventional, state-oriented approach would declare path 911, whose path metric is 0.1, to be the survivor and, since only one path entering a state is retained under the state-oriented approach, path 912, having the path metric of 0.6, would be discarded. However, assume further that the smallest branch metric for the branches extending from state 0 is 0.8 when computing the branch metrics to extend path 911 and 0.1 when computing the branch metrics to extend path 912. (Again, the difference is a consequence of the fact that the ISI component calculation is itself path-dependent.) Thus the extended versions of paths 911 and 912 would have path metrics of 0.9 and 0.7, respectively, so that it now appears that path 912—not any longer path 911—is the better one. This is illustrative of the more general observation of what can happen when a branch metric used to compute an extended pat metric is a function of the path being extended. Specifically, it is possible that a path leading into a state which had a higher path metric than another path leading into that state—and which therefore would not have been declared a surviving path if a state-oriented approach were to have been used—can nonetheless become a path with a lower path metric once the path has been extended from that state. My path-oriented approach takes advantage of this observation so as to provide more accurate decoding by allowing the path with the initially higher metric to be ultimately declared the correct one.

It is important to observe that both surviving paths 911 and 912 belong to the same sequence of transmitter subsets. Moreover, it will be remembered that the two parallel branches between current state 0 and next state 0 represent respective portion,, of transmitter subset A (as can be verified from FIGS. 4 and 7). If the prior art approach of employing the transmitter subsets and trellis diagram were to be followed in the receiver, then only one candidate path would have been extended from previous surviving path #1 into next state 0. That path would have been the same as path 911 since it ha, the smaller branch metric. That path is associated with one of the signal points which (in the case of the present embodiment) was from receiver subset $A_1$. Our earlier discussion showed, however, how it is possible that, in reality, a better estimate of what was transmitted is that it came from subset $A_2$. In this instance the prior art approach would have made a decision error by declaring one of the signal points of subset $A_1$, rat her than subset $A_2$, to have been the actual transmitted signal point.

Figure 10:
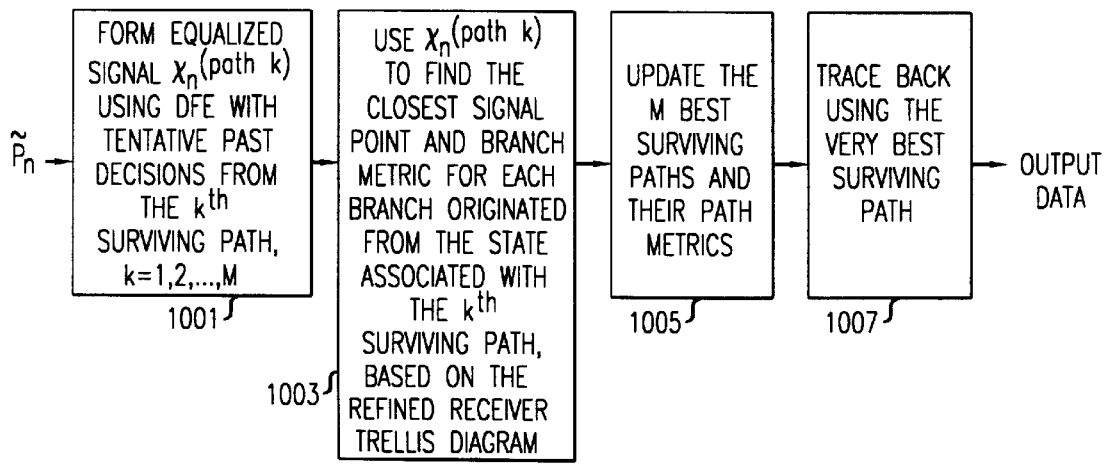
FIG. 10 is a combined block diagram/functional description view of the M-path joint DFE/decoder of FIG. 1.

FIG. 10 provides a combined block diagram/functional description view of the DFB/decoder 202. Received signal point $P_n$ is processed at block 1001 to produce an equalized signal associated with each of the M surviving paths. That is, an equalized signal $x_n^{(path\ k)}$ is formed using a DFE whose inputs are the tentative past decisions along the $k^{th}$ surviving path, k being 1, 2, 3, . . . , M.

At block 1003, equalized signal $x_n^{(path\ k)}$ is used to find:
a) the closest signal point in the receiver subset associated with each branch, and b) the branch metric for each branch of the refined receiver trellis diagram (such as the exemplary trellis diagram of FIG. 7) emanating from the state associated with the kit surviving path. Then, at block 1005, a new set of M best surviving paths are identified, along with their path metrics. The one of the M surviving paths having the smallest metric at this time—called the very best surviving path—is identified. At block 1007, data corresponding to the aforerentioned final decision $\hat{P}_{n-D}$ as to the value of a signal point transmitted D signal point earlier is found by tracing back along the very best surviving path.

The invention is applicable not only to arrangements implementing coded modulation, for which N is greater than 1, but also to arrangements using uncoded modulation, for which N is equal to 1. In the latter arrangements, the decoder is as just described (even though uncoded modulation arrangements typically use so-called "slicing" rather than decoding), with the transmitter trellis diagram being a de Fault trellis diagram having only N=1 state and only one state transition. FIGS. 11–14 exemplify this approach.

Figure 11:
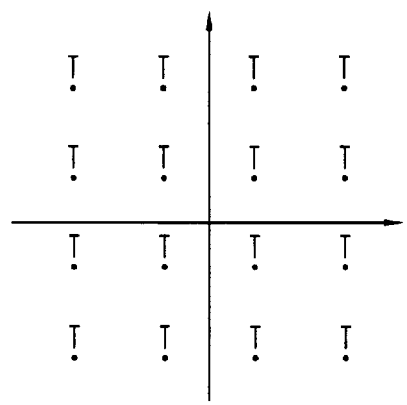
FIG. 11 shows a 16-signal-point constellation.
Figure 12:
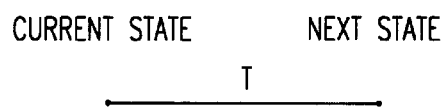
FIG. 12 shows a transmitter trellis diagram for uncoded modulation using the constellation of FIG. 11.

FIG. 11, in particular, is a 16-signal point QAM constellation that can be used in an uncoded modulation system. Since the system is uncoded, there are no constellation subsets in the trellis coding sense. However, all 16 signal points of the constellation can be thought of as comprising a single subset T. A default trellis diagram for this case is shown in FIG. 12. Since it is possible to transmit any of the 16 signal points at any time, the transmitter has only one "state" and thus the trellis diagram comprises a single node for each cycle. The one branch connecting the single current state to the single next state is labeled T, indicating simply that at any point in time the next signal point to be transmitted is a member of subset T. That is, it can be any of the 16 signal points.

Figure 14:
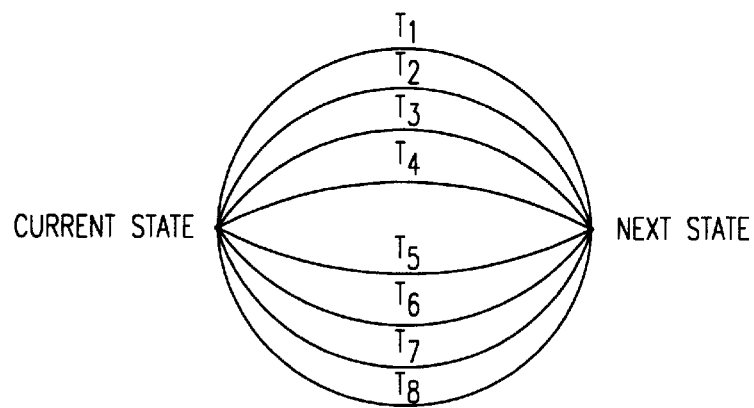
FIG. 14 shows a receiver trellis diagram based on the eight-subset partition of FIG. 13, pursuant to the principles of the invention.

In the receiver, the single transmitter subset is illustratively partitioned into 8 receiver subsets $T_1$ through $T_8$ pursuant to the principles of the present invention. The refined trellis diagram is shown in FIG. 14 wherein the single state transition in FIG. 12 is replaced by 8 parallel branches, each corresponding to one of the 8 receiver subsets. Decoding proceeds in the same manner set forth in FIG. 10.

Figure 15:
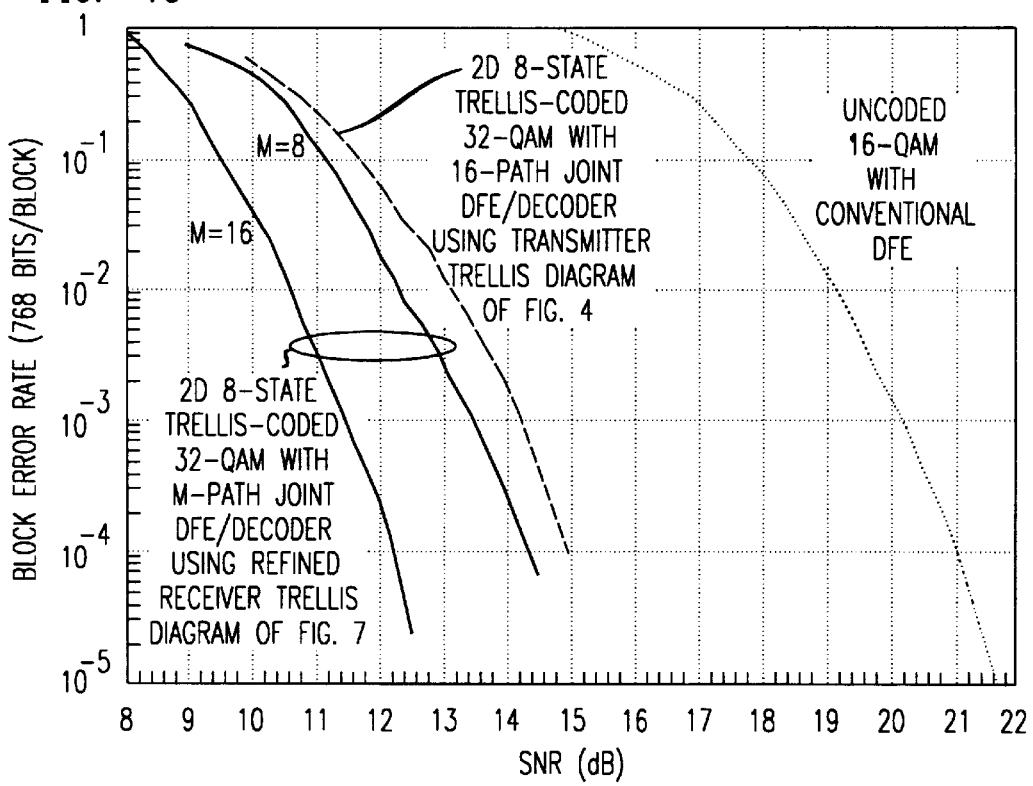
FIG. 15 shows the performance of the M-path joint DFE/decoder of FIG. 1 when the coded 32-signal-point constellation of FIG. 3 is used over a particular ISI channel using different values of M.
Figure 16:
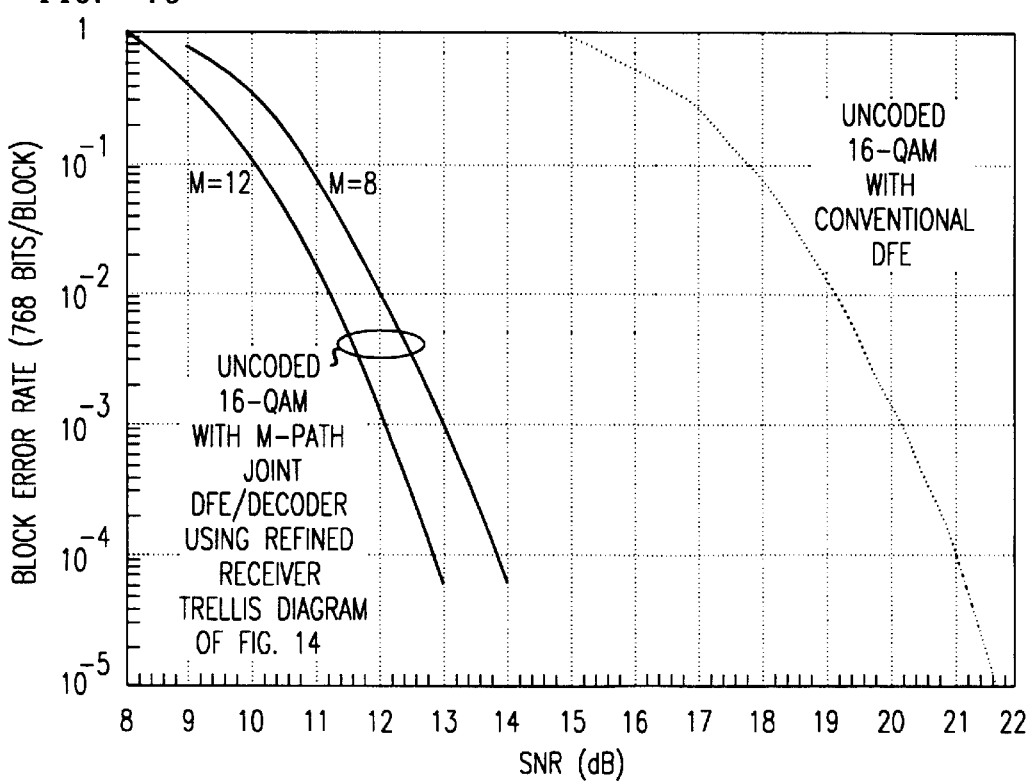
FIG. 16 shows the performance of the M-path joint DFE/decoder of FIG. when the uncoded 16-signal-point constellation of FIG. 11 is used over the same ISI channel and again using different values of M.

Error rate curves shown in FIGS. 15 and 16 make evident the advantageous nature of the present invention. Each of those FIGS. shows, for a particular one channel, curves depicting the experimentally determined block error rate as a function of the channel signal-to-noise ratio, each curve being for a respective decoding approach, as indicated. Each successive curve, moving from right to left, represents an improved level of performance in that a higher level of channel noise, i.e., a lower signal-to-noise ratio, can be tolerated while still achieving a given block error rate. (The signal-to-noise ratio shown on the x-axis in these FIGS. refers to the ratio between the signal power and the additive Gaussian noise power, without including the ISI component. The curves themselves do, however, take ISI into account.)

The various approaches represented by the curves in FIG. 15 provide a basis for providing an apple-to-apples comparison of the invention to other approaches in that each of them has a bandwidth efficiency of 4 data bits per signal point. The FIG. shows, in particular, as a benchmark the error rate curve achieved for uncoded 16-QAM using conventional DFE. Significantly better performance can be achieved using the approach described in my above-cited '063 patent application. A second benchmark curve, covering that case, is also shown in the FIG, and represents the results achieved using two-dimensional 8-state, trellis-coded 32-QAM, as set forth in FIGS. 2–4 here of, combined with an M-path joint DFE/decoder with M=16 but employing, in the receiver, the same subsets and trellis diagram that were used in the transmitter, per the embodiments disclosed in the '063 application. Advantageously, however, even better performance can be achieved using that same code and DFE/decoder but now employing the receiver subsets and refined receiver trellis diagram of FIGS. 6 and 7, pursuant to the principles of the invention. Two curves, in particular, for M=8 and M=16 are shown, each being to the left of, and thus being indicative of a higher level of performance than, either of the benchmark curves.

The performance achieved by any particular approach, as compared to another, can be expressed in terms of the processing gain, meaning the difference in signal-to-noise ratio between their performance curves at a given block error rate. Thus it is seen, for example, that at a block error rate of $10^{-4}$, (21–15=) 6 dB of processing gain is achieved by the second benchmark approach, compared with the first. Advantageously, however, an additional processing gain of (15–12=) 3 dB is achieved when employing receiver subsets and a refined receiver trellis diagram pursuant to the principles of the I resent invention (with, again, M=16).

It may also be observed that the coding gain of the particular trellis code used in the illustrative embodiment is about 3.5 dB, as compared to an uncoded 16-QAM approach. Utilizing conventional decoding techniques, that amount of coding gain would be realized only for a Gaussian channel; in an ISI channel, which the present invention is primarily concerned with, not even all of the 3.5 dB coding gain would be realized. This makes all the more dramatic the aforementioned overall coding gain of 9 dB realized by the present invention.

Figure 13:
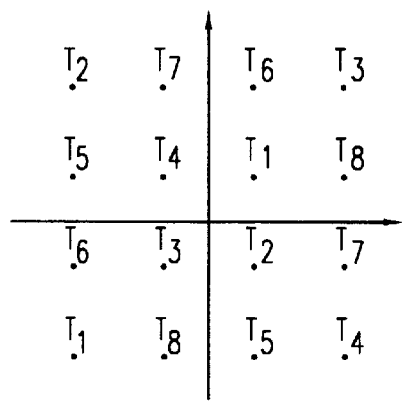
FIG. 13 shows the constellation of FIG. 11 partitioned into eight receiver subsets pursuant to the principles of the invention.

Using the same uncoded 16-QAM as a benchmark, FIG. 16 shows the restlts for M=8 and M=12 achieved via use of the invention for the uncoded modulation of FIGS. 11–12 employing the receiver subsets and refined receiver trellis diagram of FIGS. 13 and 14. The processing gain is quite significant. The present invention achieves a processing gain (at a block error rate of $10^{-4}$) of 7.5 (8.5) dB for M=8 (=12) over the prior art, even though uncoded modulation is employed in both cases.

The advantages of the invention can also be appreciated upon recognizing that for worse and worse channels, prior art straightforward DFE provides correspondingly worse error rate performance because the power in each transmitted signal point is more widely dispersed, thereby removing more and more power from the signaling interval from which the signal point is recovered for worse and worse channels, that power simply being lost into the subtracted-out DFE estimates. Advantageously, the present invention tends to recover the dispersed power to more or less the same degree, independent of how widely dispersed it is. Thus the processing gain afforded by the present invent ion for a given channel—that is, the difference in its performance as compared to a prior art benchmark approach for that channel—actually increases as the channel gets worse because the performance of the benchmark system also gets worse.

Implementing finer and finer partitioning of the transmitter subsets—that is, increasing the number of receiver subsets into which each transmitter subset is partitioned—can provide increasing error immunity since the minimum distance of the receiver subsets is thereby increased and the possibility that a received signal point will be correctly decoded is also increased. Increased numbers of receiver subsets however, gives rise to additional processing complexity in the receiver. This can be particularly disadvantageous in applications in which the receiver is battery-powered since additional processing consumes additional battery power. Thus it is desirable to have only so fine a partitioning as will achieve the desired level of performance. One advantageous way of achieving this is to monitor the magnitude of the DFE coefficients. Increasingly large coefficients implies correspondingly increased ISI in the channel and thus the desirability of increasingly finer subset partitioning in the receiver.

In arrangements embodying the principles of the invention, whether using coded or uncoded modulation, it is possible, if desired, to include another "layer" of coding, such as Reed-Solomon coding. Such coding would be applied to the data bits desired to be communicated ahead of the modulation. Thus in FIG. 1, for example, a Reed-Solomon or other coder could be interposed between scrambler 102 and S/P converter 104 and a Reed-Solomon decoder would be interposed between P/S converter 204 and descrambler 206. Conventional interleaving and de-interleaving can also be employed, as is often the case when Reed-Solomon coding is involved.

Channel 112 of the illustrative embodiment is illustratively a wired or wireless telecommunications channel extending over a significant physical distance. However, the invention is equally applicable to other transmission paths referred to as "chanels," including, for example, audio and/or video magnetic, or other, recording media. In such arrangements, as in telecommunications applications, that part of the system which applies the signal points to the channel is the "transmitter" and that part of the system which receives the signal points from the channel is the "receiver."

It was indicated hereinabove that the refined, receiver trellis diagram has state transitions corresponding to state transitions of the transmitter trellis diagram and that in preferred embodiments, as can be seen from a comparison of FIGS. 4 and 7, the two trellis diagrams are the same except that the receiver trellis diagram has illustratively two branches for each state transition rather than one. In other embodiments, however, it may be possible to have a receiver trellis diagram having different states than those of the transmitter trellis diagram and/or a different set of state transitions while yet satisfying the above-stated criterion that in that there can be found at least some correspondence between a) transitions between particular trellis diagram state pairs in the transmitter and b) transitions between trellis diagram state pairs in the receiver and it being further the case that for at least one pair of states in the receiver trellis diagram, there are at least two branches connecting them.

It will be appreciated by those skilled in the art that the diagrams herein represent conceptual views of illustrative circuitry embodying the principles of the invention. The functions of the various elements shown in the FIGS. would, in preferred embodiments, be implemented by one or more programmed processors, digital signal processing (DSP) chips, or the like rather than individual hardware elements.

In the claims hereof any element expressed as a means for performing a specified function is intended to encompass any way of performing that function including, for example, a) a combination of circuit elements which performs that function or b) software in any form (including, therefore, firmware, microcode or the like) combined with appropriate circuitry for executing that software to perform the function. The invention as defined by such claims resides in the fact that the functionalities provided by the various recited means are provided, combined and brought together in the manner which the claims call for. Applicant thus regards any means which can provide those functionalities as equivalent as those shown herein.

It will be appreciated that those skilled in the art will be able to devise various arrangements which, although not explicitly shown or described herein, embody the principles of the invention and thus are within its spirit and scope.

What is claimed is:

1. A method of processing transmitted signal points received from a transmitter, each transmitted signal point being from a respective one of a sequence of transmitter subsets of signal points, as defined by an N-state transmitter trellis diagram, N being greater than or equal to 1, the method comprising steps of:

identifying, in response to the received signal points, successive sets of M surviving signal point paths through a receiver trellis defined by an N-state receiver trellis diagram, the identifying being such that more than one path corresponding to a particular sequence of receiver trellis states can be identified as ones of the surviving paths, and forming decisions as to the identities of said transmitter signal points as a function of at least one of said surviving paths.

2. A method of processing transmitted signal points received from a transmitter, each transmitted signal point being from a respective one of a sequence of transmitter subsets of signal points, as defined by an N-state transmitter trellis diagram, N being greater than or equal to 1, the method comprising:

identifying, in response to the received signal points, successive sets of M surviving signal point paths through a receiver trellis defined by an N-state receiver trellis diagram, the identifying being such that more than one path corresponding to a particular one of said sequences can be identified as ones of the surviving paths; and forming decisions as to the identities of said transmitter signal points as a function of at least one of said surviving paths; and wherein said transmitter transmits a signal point from a particular one of said transmitter subsets upon undergoing a transition, between at least a particular current state and a particular next state of said transmitter trellis diagram, wherein said receiver trellis diagram includes a plurality of branches between said particular current and next states, said branches being associated with respective receiver subsets, each being a part of said particular transmitter subset, and wherein said processing determines paths through said receiver trellis as though said receiver subsets were said transmitter subsets and as though said receiver trellis diagram were said transmitter trellis diagram.

3. The invention of claim 2 wherein the minimum distance between the signal points of at least one of said receiver subsets is greater than the minimum distance between the signal points of said particular transmitter subset.

4. The invention of claim 2 wherein the number of receiver subsets in said particular transmitter subset is selected as a function of the characteristics of a channel over which said transmitted signal points are transmitted.

5. The invention of claim 2 wherein each set of M surviving signal point paths is selected from a set of candidate paths through said receiver trellis, each candidate path having an associated path metric and said surviving signal point paths being the M candidate paths with the smallest associated path metrics.

6. The invention of claim 5 wherein each said candidate path is comprised of a previously identified surviving path extended along a branch of said receiver trellis diagram, and wherein the path metric of each of said candidate paths is a function of a) the path metric associated with said previously identified surviving path and b) a branch metric associated with said branch.

7. The invention if claim 6 wherein said branch metric is a function of a) an individual one of the received signal points, b) the signal points along said previously identified surviving path, and c) the signal points comprising the receiver subset associated with said branch.

8. The invention of claim 6 wherein said branch metric is a function of the distance between a) a version of an individual one of the received signal points compensated for intersymbol interference (ISI) and b) and the closest signal point of the receiver subset associated with said branch, the ISI compensation being a function of the signal points along said previously identified surviving path.

9. The invention of claim 8 wherein said ISI compensation is provided by the steps of
   generating an estimate of the ISI component of said individual received signal point in a decision feedback equalizer whose output is a function of said signal point along said previously identified surviving path, and
   subtracting said ISI estimate from said individual received signal point.

10. A method for use in a receiver which receives a sequence of signal points of a signal constellation, the signal points being transmitted by a transmitter to the receiver over a channel, the transmitter including a trellis encoder which encodes input data pursuant to a transmitter trellis code defined by a trellis diagram, the trellis diagram defining allowed state transitions between pairs of the N encoder states, each of the pairs being associated with a particular transmitter subset of signal points of the constellation from which the transmitter transmits one of the signal points when the encoder undergoes that particular transition, the method including the steps of
   a) generating in response to each received signal point a plurality of equalized signal points, each equalized signal point being generated as a function of a respective estimate of the intersymbol interference component of the said received signal point, each estimate being a function of a respective present surviving path through a trellis defined by a receiver trellis diagram,
   b) generating a path metric for each of a plurality of candidate paths, each candidate path comprising a respective one of the present surviving paths extended from its respective terminating state along an associated branch of the receiver trellis diagram, the receiver trellis diagram having state transitions corresponding to state transitions of the transmitter trellis diagram, except that the receiver trellis diagram has at least two branches connecting at least one of said pairs of states, said at least two branches being associated with respective receiver subsets, each being a part of the transmitter subset associated with that pair of states, and
   c) selecting ones of the candidate paths to be updated surviving paths, the selected ones of the candidate paths being the candidate paths having the M smallest path metrics.

11. The invention of claim 10 comprising the further step of forming decisions as to the transmitted signal points as a function of at least one of the surviving paths.

12. The invention of claim 11 wherein the trellis encoder is an N-state encoder, N greater than or equal to 1.

13. The invention of claim 12 wherein said transmitter trellis diagram and said receiver trellis diagram each have N states.

14. The invention of claim 12 wherein the minimum distance between the signal points of at least one of said receiver subsets is greater than the minimum distance between the signal points of the transmitter subset of which it is a part.

15. The invention of claim 14 wherein said path metric of each candidate path is a function of a) the path metric of the one of the present surviving paths and b) a branch metric associated with the associated branch.

16. The invention of claim 15 wherein said branch metric is a function of a) an individual one of the received signal points, b) the signal points along said respective one of the present surviving paths, and c) the signal points comprising the receiver subset associated with said branch.

17. The invention of claim 15 wherein said branch metric is a function of the distance between a) a version of an individual one of the received signal points compensated for intersymbol interference (ISI) and b) and the closest signal point of the receiver subset associated with said branch, the ISI compensation being a function of the signal points along said respective one of the present surviving paths.

18. The invention of claim 17 wherein said ISI compensation is provided by the steps of
   generating an estimate of the ISI component of said individual received signal point in a decision feedback equalizer whose output is a function of said signal points along said respective one of the present surviving paths, and
   subtracting said ISI estimate from said individual received signal point.

19. A method of processing transmitted signal points received from a transmitter, each transmitted signal point being a sequence of transmitter subsets of signal points as defined by an N-state transmitter trellis diagram, N being greater than or equal to 1, the method comprising:
   identifying, in response to the received signal points, successive sets of M surviving signal point paths through a receiver trellis defined by an N-state receiver trellis diagram, the receiver trellis diagram being refined with respect to the transmitter trellis diagram; and
   forming decisions as to the identities of said transmitter signal points as a function of at least one of said surviving paths.

20. The method of claim 19, wherein the refined trellis diagram has more branches between at least one current state and one next state than the transmitter trellis diagram.

21. The method of claim 20, wherein each set of M surviving signal point paths is selected from a set of candidate paths through said receiver trellis, each candidate path having an associated path metric and said surviving signal point paths being the M candidate paths with the smallest associated path metrics.

22. The method of claim 20, wherein N=1.

23. The method of claim 19, wherein the M surviving paths include more than one path through a particular sequence of receiver trellis states.

24. The method of claim 1, wherein the receiver trellis diagram has more branches between at least one current state and one next state than the transmitter trellis diagram.

25. The method of claim 24, wherein each set of M surviving signal point paths is selected from a set of candidate paths through said receiver trellis, each candidate path having an associated path metric and said surviving signal point paths being the M candidate paths with the smallest associated path metrics.

26. The method of claim 24, wherein N=1.

27. The method of claim 1, wherein the M surviving paths include more than one path through a particular sequence of receiver trellis states.

* * * * *